(12) United States Patent
Lanfranchi

(10) Patent No.: US 9,027,736 B2
(45) Date of Patent: May 12, 2015

(54) ROTARY APPARATUS FOR TRANSFERRING BOTTLES OR CONTAINERS IN GENERAL

(71) Applicant: Lanfranchi S.R.L., Collecchio (PR) (IT)

(72) Inventor: Mario Lanfranchi, Collecchio (IT)

(73) Assignee: Lanfranchi S.R.L., Collecchio (IT)

( * ) Notice: Subject to any disclaimer, the term of this patent is extended or adjusted under 35 U.S.C. 154(b) by 0 days.

(21) Appl. No.: 14/056,177

(22) Filed: Oct. 17, 2013

(65) Prior Publication Data

US 2014/0102855 A1  Apr. 17, 2014

(30) Foreign Application Priority Data

Oct. 17, 2012 (IT) .............................. PR2012A0067

(51) Int. Cl.
  *B65G 47/84* (2006.01)
  *B65G 29/00* (2006.01)
(52) U.S. Cl.
  CPC .............. *B65G 29/00* (2013.01); *B65G 47/848* (2013.01); *B65G 2201/0244* (2013.01)
(58) Field of Classification Search
  CPC ... B65G 47/848; B65G 47/815; B65G 47/904
  USPC ......... 198/377.04, 377.08, 441, 459.2, 471.1, 198/474.1, 475.1, 476.1
  See application file for complete search history.

(56) References Cited

U.S. PATENT DOCUMENTS

| | | | | |
|---|---|---|---|---|
| 1,846,009 | A * | 2/1932 | White et al. | 198/477.1 |
| 4,511,027 | A * | 4/1985 | Zamboni | 198/470.1 |
| 4,726,876 | A * | 2/1988 | Tomsovic, Jr. | 156/552 |
| 4,823,536 | A * | 4/1989 | Manservigi et al. | 53/466 |
| 6,832,679 | B2 * | 12/2004 | Berndtsson | 198/471.1 |
| 6,848,566 | B2 * | 2/2005 | Harnish et al. | 198/459.8 |
| 7,275,633 | B2 * | 10/2007 | Zimmermann | 198/474.1 |
| 7,543,697 | B2 * | 6/2009 | Legallais | 198/478.1 |
| 7,740,125 | B2 * | 6/2010 | DerMarderosian et al. | 198/476.1 |
| 8,202,079 | B2 * | 6/2012 | Litzenberg et al. | 425/534 |
| 8,720,666 | B2 * | 5/2014 | Papsdorf et al. | 198/377.02 |
| 8,763,782 | B2 * | 7/2014 | Laubli | 198/346.1 |

* cited by examiner

*Primary Examiner* — Leslie A Nicholson, III
*Assistant Examiner* — Keith R Campbell
(74) *Attorney, Agent, or Firm* — Young & Thompson

(57) ABSTRACT

A rotary conveyor apparatus, for collecting, transferring and releasing containers, includes:
a platform (9) rotating according to a rotation axis (AA);
trolleys (3), supported by the platform, and slidable in a corresponding slit extending from the periphery (9B) to the center of rotation through an internal conduit (6), within the trolleys a certain degree of suction is created for a determined rotation angle of the platform through a suction box (4), arranged at the lower part and in contact with the platform, including a suction opening (7) extending along an angular section thereof. The trolleys are movable relative to the rotation of the platform, and are moved from the periphery to the center of rotation and vice versa during a complete rotation of the platform. The movement action is directed by a first guide closed loop-like on the box and a second radial guide integral with the platform.

9 Claims, 5 Drawing Sheets

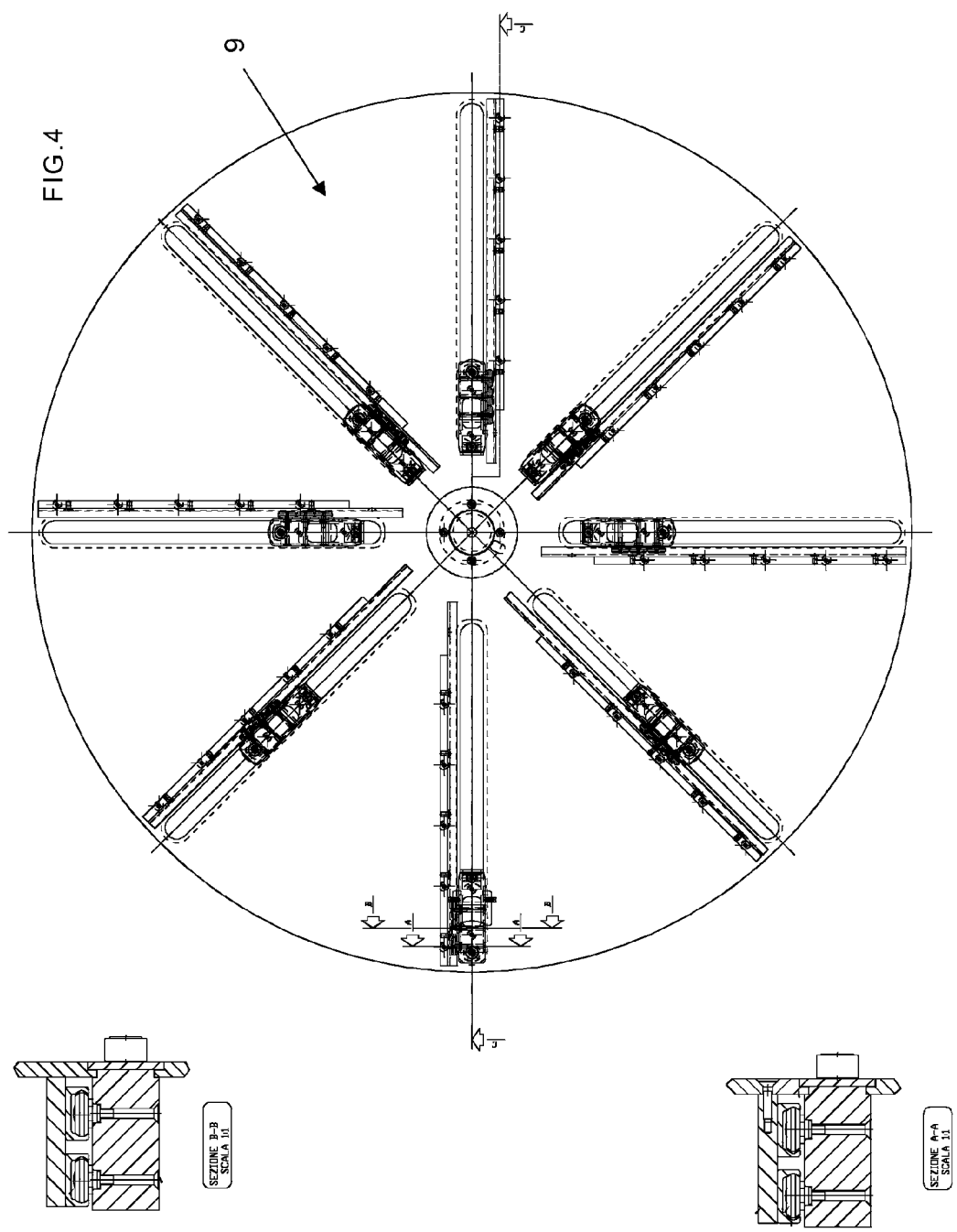

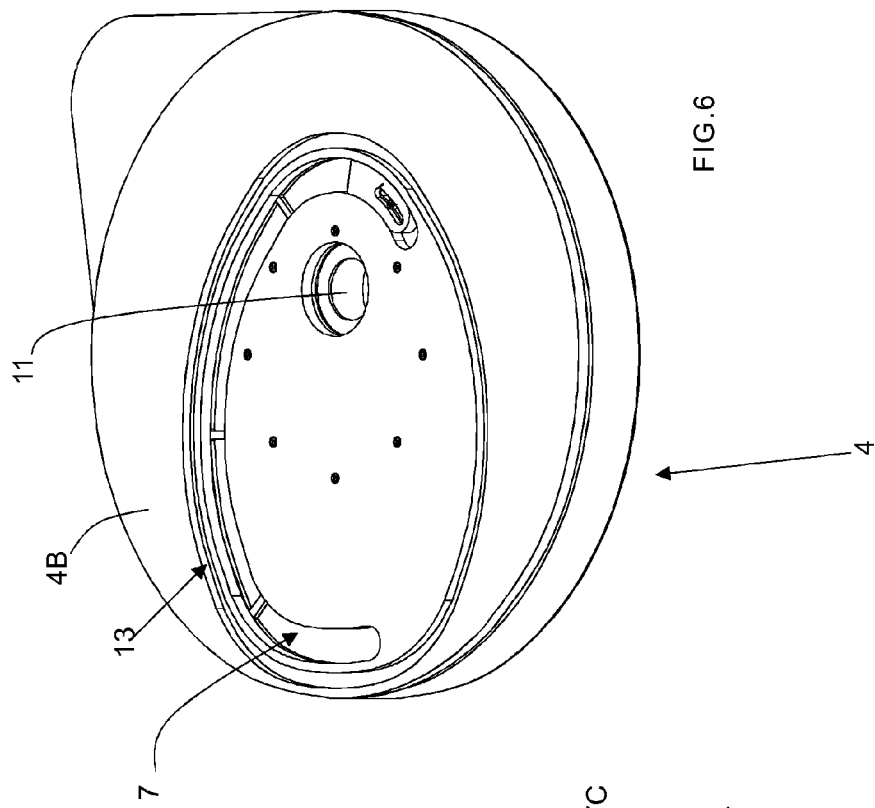
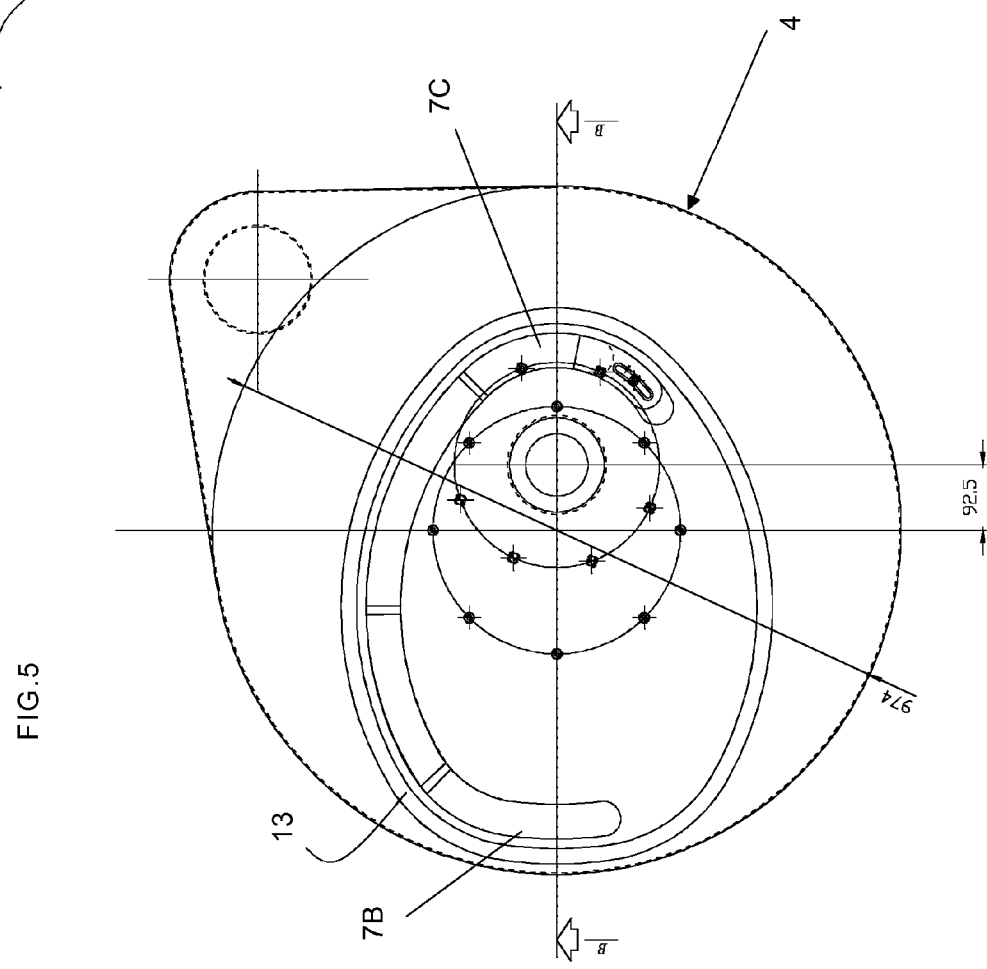

ROTARY APPARATUS FOR TRANSFERRING BOTTLES OR CONTAINERS IN GENERAL

FIELD OF APPLICATION OF THE INVENTION

The present finding is situated in the field of packaging and bottling. In particular, it refers to a device comprising a rotary plate that carries, on the upper part, gripper means adapted to retain plastic bottles or more generally plastic containers by means of a suction system. In other words, the device allows the engagement of the container by a line or machine upstream by means of the reduced-pressure suction system and the subsequent release on another line or machine downstream of the apparatus itself following an angular rotation thereof.

STATE OF THE ART

One category of said apparatuses are known by the term rotary star conveyors and generally comprise a plurality of fixed elements or cavities, arranged on the periphery of at least one rotary disc and equidistant from each other; in addition, each element is connected to a box within which reduced pressure is created, such that by means of suitable channels inside the cavities, it is possible to draw the container and retain it in the suitable seat of the cavity.

The above-described devices are only able to collect the container substantially arranged (on the line or machine upstream) at a distance equal to approximately the radius of the disc or rotary star and to release it of course at an equal distance on the line or machine downstream.

STATEMENT AND ADVANTAGES OF THE FINDING

Object of the present finding is to provide a conveyor apparatus of the type rotating according to a generally vertical rotation axis thereof, for bottles or more generally containers, which can remedy the abovementioned lamented geometric constraint due to the fixed arrangement of the cavities, allowing the collection and release points of the container to be varied.

The advantage of the finding is that it is possible to handle the container, varying the collection destination or the final release destination in an independent manner with respect to each other.

Said objects and advantages are all achieved by the rotary conveyor apparatus, object of the present finding, which is characterized for that provided in the below-reported claims.

BRIEF DESCRIPTION OF THE FIGURES

This and other characteristics will be clearer from the following description of several embodiments illustrated as a mere non-limiting example in the enclosed drawings.

FIG. 4: illustrates a plan view of the platform pursuant to FIG. 3, FIG. 5: illustrates a plan view of the suction box, of the apparatus, FIG. 6: illustrates a perspective view of the suction box.

DESCRIPTION OF THE FINDING

Figure 1:
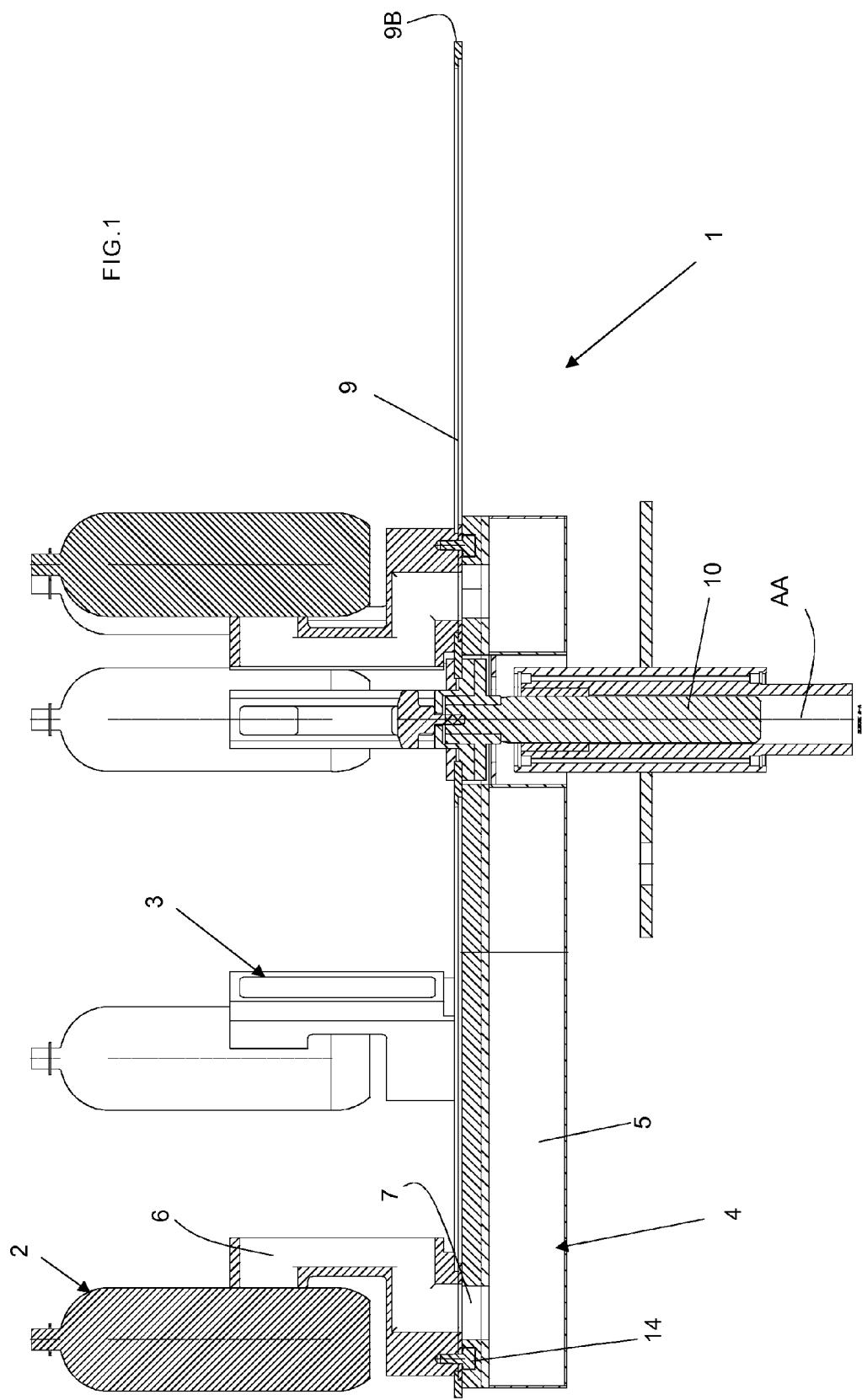
FIG. 1: illustrates a section view of the conveyor apparatus, object of the finding, without the lateral guides.
Figure 2:
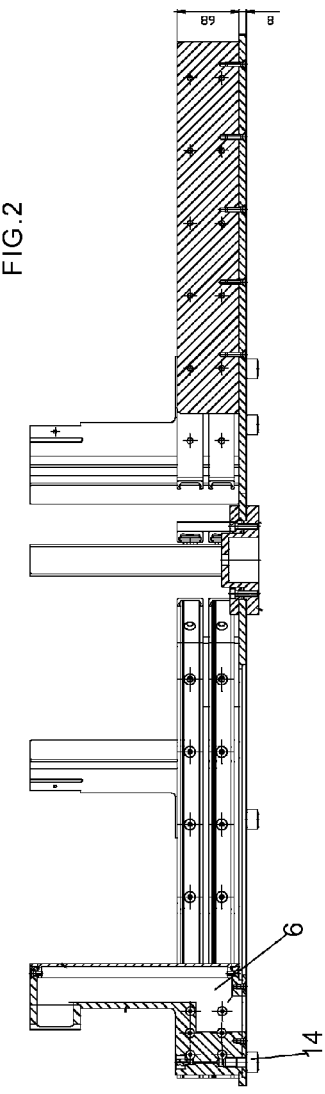
FIG. 2: illustrates a section of the upper platform with lateral guides and gripper trolleys.
Figure 3:
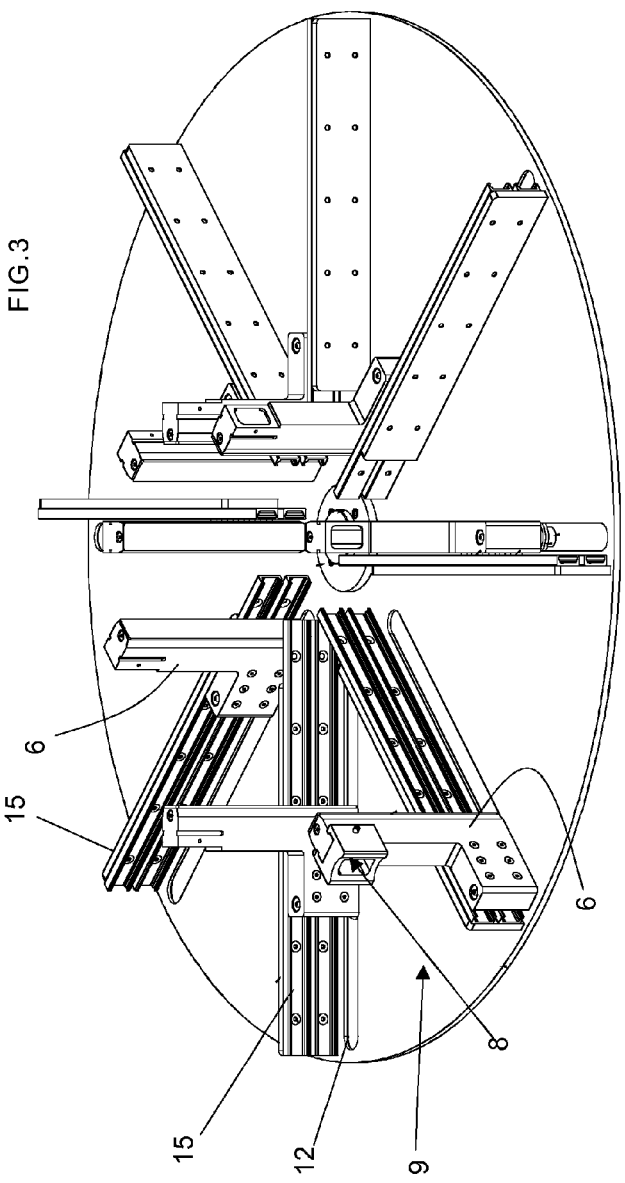
FIG. 3: illustrates a top perspective view of the platform or rotary disc.
Figure 8:
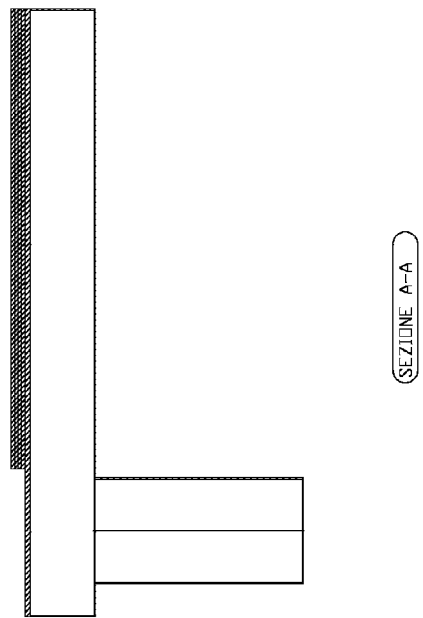
FIGS. 7 and 8: illustrate further views of the suction box.
Figure 7:
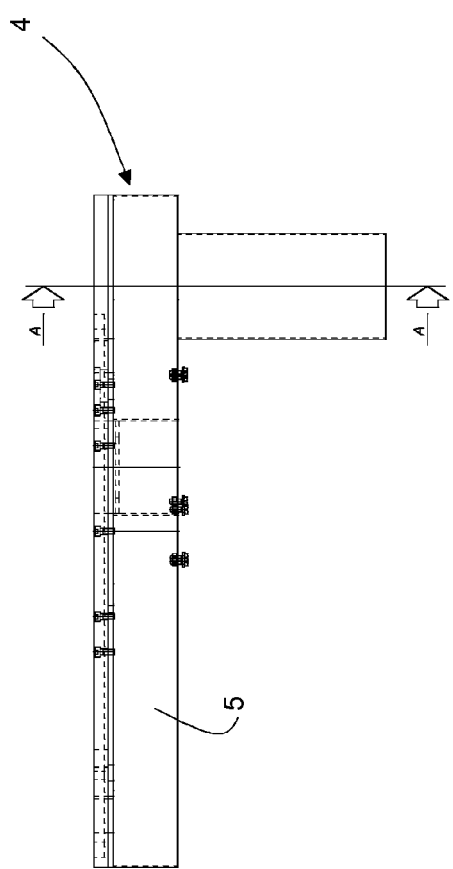

With particular reference to the abovementioned figures, the reference number 1 indicates a conveyor apparatus of rotary type in its entirety, adapted to collect, transfer and release containers 2, e.g. empty plastic bottles.

The apparatus comprises a support structure or platform 9, i.e. a discoidal element, which can rotate due to the thrust of drive means of known type (not illustrated); the rotation occurs according to the relative rotation axis indicated with AA in the figures, defined by a central rotation shaft, indicated with 10.

The platform 9 therefore has an upper face and a lower face; the upper face of the disc 9 supports trolleys or means 3 for retaining the container. Said trolleys are adapted to retain the container, as explained hereinbelow, by means of suction during a determined angular rotation of the platform.

Below the platform 9, a box 4 is instead placed (in contact) that acts as a suction box.

The disc 9 is rotating while the underlying box 4 remains fixed on a suitable structure and provides the necessary suction, through the opening 7, to the means or trolleys 3.

The suction box 4 is constituted by a closed structure, preferably with cylindrical conformation with cavity 5 at its interior, within which a reduced pressure is maintained through a suction system of known type (not illustrated).

The suction box 4 bears, in offset position with respect to its external casing, a hole 11 for allowing the traversing of the shaft 10 that rotates the disc 9; as said, the hole 11 is positioned at a distance off-centered with respect to the center of the box as indicated in FIG. 5; the box will be eccentric with respect to the rotation axis AA, as seen in FIG. 1.

On the upper surface 4B of the suction box 4—such surface which in operating conditions will be directed against the lower surface of the disc 9—one observes the presence of a slit 7 which is extended according to an irregular C-shaped progression; with reference to FIG. 5, the right curved section 7B of the slit 7 is arranged in proximity of the axis AA of the disc 9, i.e. the hole 11, while the left curved section 7C is extended adjacent to the edge 9B of the disc 9.

The opening 7 is extended for an angular portion of the box and only allows the suction for a determined rotation angle of the disc 9.

Overall, the slit 7 allows the suction system to suck air from the disc 9 situated above the suction box 4 and more precisely through a plurality of slits 12, which are extended in a substantially radial manner on the platform 9 within which relative trolleys 3 or container retention means slide.

In such a manner, the opening 7 places the cavity 5 of the box 4 in communication with the trolleys 3 each time the latter arrive in position on the slit 7 during the rotation of the platform 9.

At this point, it is necessary to indicate the presence of a guide rail 13 closed loop-like, within which the trolley 3 is engaged such that the latter can describe a circular path along said guide 13 during the rotation of the platform 9.

According to the embodiment, the guide 13 is obtained on the surface 4B of the suction box 4 and is such to have, for a certain section, the same parallel progression of the opening 7. Still according to the embodiment, within said groove 13, a pin 14 is engaged which is projected below the trolley 3.

In addition, the trolley 3 is integral by means of rolling means with a lateral support 15 arranged along the relative slide slit 12. From that described above, one can infer that each trolley 3, during the rotation of the disc 9, will be moved:

Along a substantially radial direction, given by the slit 12, according to a reference integral with the platform, Along a loop-like path, given by the groove 13, according to a reference fixed outside the apparatus.

In the embodiment, the lateral support or guide supports the trolley 3 by means of rails and slide bearings; in detail, said slide bearings are mounted laterally and cantilevered with respect to the trolley, while the lower part of the trolley 3 bears:

a conduit 6 which is extended internally before exiting through an outlet mouth 8; in such a manner, the mouth of the conduit 6 is arranged so as to be interfaced with, i.e. be situated at, the opening 7 and hence the internal chamber 5 of the suction box 4; in such configuration, the trolleys 3 draw, by means of suction, the containers 2 through the internal conduit 6 and retain them for the entire duration of the rotation, corresponding with the presence of the lower slit 7.

the rolling pin 14 which is projected downward, being engaged in the corresponding track or guide 13.

In other words: a cam 13 guides the trolley relative to the suction box 4, a support guide 15 allows the relative translation on the platform 9; a progression of the trolley 3 follows that is eccentric relative to the axis AA and therefore the rotary platform in this case has a different pace from container engagement to container release, due to the eccentric positioning of the slit 7.

Indeed, that stated above allows each trolley 3 to have a progression substantially corresponding with the slit 12 (relative to the platform), i.e. starting from the periphery, each trolley is moved closer to the axis AA before then returning to the initial position: the entire to-and-fro movement is completed during a rotation of 360° of the support structure 9.

The suction system is of "controlled leakage" type, i.e. the leakage between the fixed disc 9 and the box 4 is limited and has no significant impact on the total reduced pressure created inside the box 4.

From that set forth above, it follows that notwithstanding the presence of a suction opening 7 which is extended along an angular section of the disc rotation, the suction will remain largely confined within the box and only through the slit 7 and each relative conduit 6 of the trolleys 3.

The invention claimed is:

1. A rotary conveyor apparatus, for collecting, transferring and releasing containers comprising:
    a platform that rotates about a rotation axis;
    a support trolley, supported by said platform, and slidable in a respective slit that extends from a periphery of said platform to said rotation axis, wherein said trolley is movable relative to the platform and is moved from the periphery of the platform to the rotation axis and vice versa during a complete rotation of the platform;
    an internal conduit, within said trolley, through which suction is created for a determined rotation angle of the platform; and
    a suction box, arranged at a lower part of said platform and in contact with said platform, comprising a suction opening that extends along an angular section of the platform on the suction box.

2. The rotary conveyer apparatus according to claim 1, wherein said trolley is moved relative to said platform by a closed loop-like guide on the suction box and a radial guide on the platform,
    wherein during rotation of the platform, said trolley is moved:
    in a radial direction given by the radial guide, according to a reference integral with the platform, and
    in a loop-like path given by the closed loop-like guide, according to a reference fixed outside the apparatus.

3. The rotary conveyer apparatus according to claim 2, characterized in that said closed loop-like guide comprises a closed loop-like track, comprising a pin in said track that is engaged for rolling the trolley, the pin being extended below said trolley.

4. The rotary conveyer apparatus according to claim 2, wherein said radial guide is integral with the platform, and said radial guide supports the trolley via rails and slide bearings, mounted laterally and cantilevered with respect to the trolley.

5. The rotary conveyer apparatus according to claim 1, characterized in that said opening is obtained on an upper surface of the suction box, directed against a lower surface of the platform; the opening having at least two curved sections, one of which is arranged in proximity of the axis of the platform, while the other is extended adjacent to the edge of the platform.

6. The rotary conveyer apparatus according to claim 1, characterized in that the conduit extends inside the trolley and outputs through an outlet mouth adapted to retain the container.

7. The rotary conveyer apparatus according to claim 1, characterized in that said conduit is positioned, along a rotation section of the platform, at the opening and thus at a relative chamber inside the suction box within which a vacuum is provided; whereby, said trolleys retain the relative container.

8. The rotary conveyer apparatus according to claim 1, characterized in that leakage between the platform and the suction box is limited and has no considerable impact on the total reduced pressure created inside the suction box and, wherein the suction remains confined between said suction box and, through the opening, each relative conduit of the trolleys.

9. The rotary conveyer apparatus according to claim 1, characterized in that the suction box is eccentric with respect to the rotation axis and comprises a hole in an offset position with respect to an external casing of the suction box, wherein the hole accommodates a shaft that rotatably controls the platform.

* * * * *